United States Patent Office 3,463,269
Patented Aug. 26, 1969

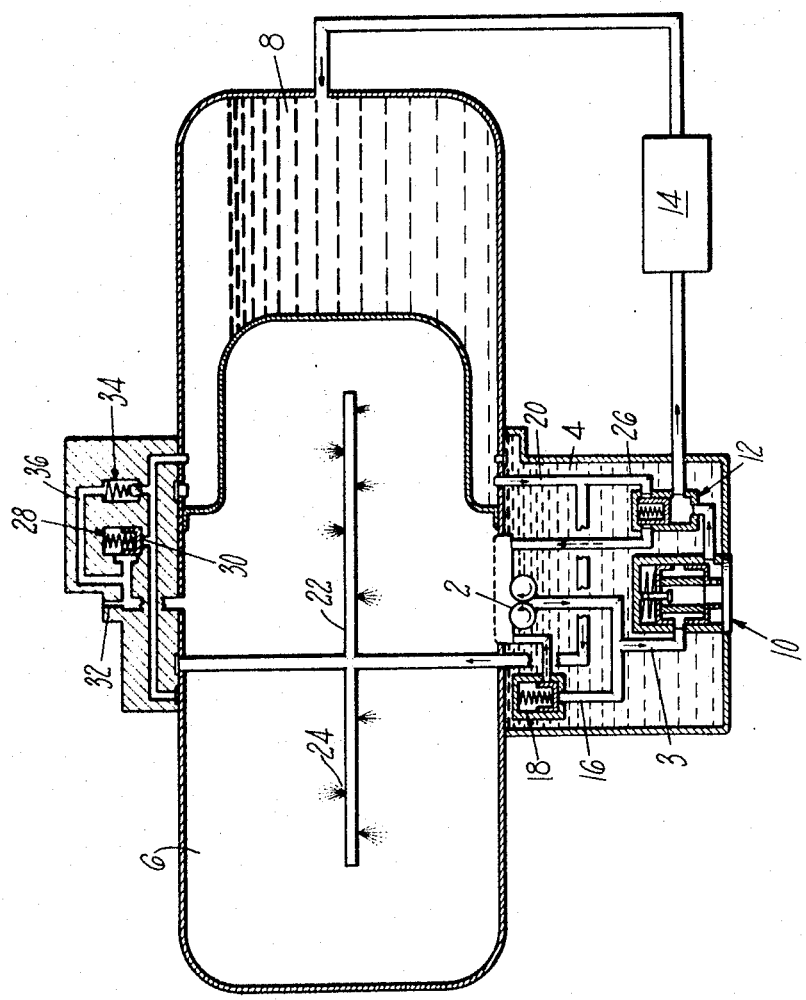

3,463,269
LUBRICATION SYSTEM
Raymond N. Quenneville, Suffield, Conn., assignor, by mesne assignments, to the United States of America as represented by the Administrator of the Federal Aviation Administration
Filed June 14, 1967, Ser. No. 645,917
Int. Cl. F16n 7/38, 39/02
U.S. Cl. 184—6          2 Claims

ABSTRACT OF THE DISCLOSURE

A lubrication system for a mechanism utilizes a single pump to transfer the lubricant from the mechanism sump to a pressure regulated accumulator. The accumulator provides constant oil flow to the spray bars located within the mechanism regardless of the particular pump speed. Lubrication of the mechanism is accomplished through orifices disposed in the spray bars at points where lubrication of the mechanism is desired.

---

The invention described and claimed herein resulted from work done under U.S. Government contract No. FA–SS–66–5; the U.S. Government has an irrevocable, nonexclusive license under this application to practice and have practiced the invention claimed herein, including the unlimited right to sublicense others to practice and have practiced the claimed invention for any purpose whatsoever.

BACKGROUND OF THE INVENTION

Field of the invention

This invention relates to a lubrication system for a mechanism and particularly to a lubrication system which utilizes a single lubricant pump and delivers a constant lubricant flow to the mechanism independently of the pump speed.

Description of the prior art

A typical lubrication system, according to the prior art, would be as follows: the air-lubricant foam in the sump of the mechanism would be pumped by a scavenge pump through a heat exchanger into a settling tank, wherein the mixture would remain for a fixed period of time so that the air could separate from the lubricant. A second pump, or lube pump, would then transfer lubricant from the settling tank to the spray bars located within the mechanism. A bypass would have to be provided around the lube pump to return an excess amount of lubricant to the settling tank in the event that the pump speed was greater than that required to furnish the proper lubricant flow to the mechanism. If, for instance, the lube pump was driven at one speed by the engine of an aircraft during flight, and at another speed by an auxiliary motor means during ground operations, the pump would be sized to deliver the proper flow of lubricant at the lower of the two pump speeds. Therefore, at the higher pump speed, since the flow output of the pump is essentially proportional to its speed, the excess lubricant would be bypassed back to the settling tank in order to prevent an excessive amount of lubricant from reaching the mechanism. Since my system does not utilize a lube pump but instead a pressure regulated accumulator tank, this problem is obviated. My system, in addition to providing a constant lubricant flow rate regardless of the speed of the single pump utilized to supply the accumulator tank, also utilizes fewer and less complex components, thereby making it lighter in weight, more reliable, and less expensive than lubrication systems known heretofore.

Summary of the invention

An object of the present invention is to provide a lubrication system which utilizes a single pump.

Another object of the present invention is to provide a lubrication system for a mechanism which requires no separate air-lubricant separator.

A further object of the present invention is to provide a lubrication system for a mechanism which allows lubrication of the mechanism by splash means in the event of pump malfunction.

In accordance with the present invention a lubrication system is provided by the combination of a pump disposed in the mechanism sump, an accumulator tank, and spray bars connected to the accumlator tank and located within the mechanism having orifices therein located for spraying lubricant on to the portion of the mechanism which requires lubrication. The pump transfers the lubricant from the sump to the accumulator tank the pressure of which is regulated to a predetermined magnitude. The accumulator supplies lubricant at a constant flow rate, via the spray bars, to the mechanism, the pressure in which is atmospheric; since the pressure in the accumulator tank is regulated, the pump speed plays no part in determining the flow rate from the accumulator to the mechanism.

In further accord with the present invention, a pressure responsive bypass valve is disposed in the fluid conduit from the accumulator tank to the spray bars so that in the event of a pump failure, the lubricant in the accumulator tank will empty into the sump as the bypass valve opens in response to a pressure at the pump outlet below a predetermined limit. The flooding of the sump provides a uniform lubricant level therein, which allows lubrication of the mechanism by splash in the event of pump malfunction.

The foregoing and other objects, features and advantages of the present invention will become more apparent in light of the following detailed description of a preferred embodiment thereof, as illustrated in the accompanying drawing.

DESCRIPTION OF THE DRAWING

The sole figure is a schematic drawing of an exemplary embodiment of a lubrication system in accordance with the present invention.

DESCRIPTION OF THE PREFERRED EMBODIMENT

Referring now to the figure, a pump 2, disposed in the sump 4 of a gearbox 6, pumps lubricant to an accumulator tank 8 via a first fluid conduit 3. In the first fluid conduit 3 there are disposed a filter 10, a first, normally closed, pressure responsive valve 12, and a heat exchanger 14. A first bypass conduit 16 is provided for connecting the first fluid conduit 3 to the sump 4. A second, normally closed, pressure responsive valve 18 is disposed in the bypass conduit 16 and adapted to open in response to a pressure at the pump outlet above a predetermined limit. A second fluid conduit 20 connects the accumulator tank 8 with spray bars 22, and the lubricant is directed from the accumulator tank 8 through the conduit 20 and the spray bars 22 to the orifices 24 which are located at the parting mesh of the gears (not shown) for spraying oil thereon. A second bypass conduit 26 is provided, connecting the line 20 with the sump 4. The first pressure responsive valve 12 is also disposed in the conduit 26 as well as in the conduit 3 as mentioned heretofore. The purpose of the bypass conduit 26 and the first pressure responsive valve 12 is to allow the lubricant in the accumulator tank 8 to drain into the sump 4 in the event of pump malfunction. If the pump should malfunction, and the perssure at the pump outlet fall below a predetermined value, the first pressure responsive valve 12 will open and expose the bypass conduit 26 to the sump 4, thereby emptying the accumulator tank into the sump. When this occurs the gears are lubricated by splash action.

The pressure in the accumulator tank 8 is regulated by a pressure regulating valve 28 which is disposed in a conduit 30 which connects tank 8 with vent 32. The pressure regulating valve 28 is adapted to open and vent the accumulator tank 8 through a gearbox vent 32 to the atmosphere in response to a pressure in the accumulator tank 8 above a predetermined value. There is also provided a high pressure relief valve 34 disposed in the conduit 36 and connected to the gear box vent 32 through the conduit 30 for relieving the accumulator tank 8 in case of over-filling which in turn would cause an excessively high pressure therein.

Heat exchanger 14 is provided to cool the lubricant during normal operation. In the case of start up on the gear box when the lubricant is cold and its viscosity is higher than during steady state operation of the gearbox, or during cold weather operation when the viscosity of the oil would be high, the pressure at the pump outlet is higher than during normal steady state operation and, therefore, the relief valve 18 opens and allows the lubricant pumped by pump 2 to be returned to the sump 4 without going through the heat exchanger 14. Lubrication of the gears is done by splash action during this high lubricant viscosity condition. As the lubricant becomes heated, its viscosity is reduced and the pressure at the pump outlet is thereby likewise reduced. When the pressure at the pump outlet falls below the value at which the relief valve 18 opens, the relief valve 18 will close and the lubricant will be ducted through its normal route, that is, through conduit 3, the filter 10, the sump valve 12 and the heat exchanger 14 to the accumulator tank 8.

It will be appreciated by those skilled in the art that no separate air-lubricant separator is required in the lubrication system according to the present invention. When the pump pumps the air-lubricant mixture to the accumulator tank, the air will rise to the top of the tank and the lubricant will fall to the bottom due to the greater weight of the lubricant. Therefore, the air separates from the lubricant in the accumulator tank 8 naturally, with no separate apparatus being required for that purpose.

There has thus been described a preferred embodiment of a lubrication system in accordance with the present invention. While a gearbox has been shown as an example to describe the present invention, it will be obvious to anyone skilled in the art that any mechanism requiring similar lubrication will be benefited by the teachings of my invention. Therefore, it should be understood by those skilled in the art that various changes and omissions in the form and detail thereof may be made therein without departing from the spirit and scope of the invention.

What I claim as new and desire to secure by Letters Patent of the United States is:

1. A lubrication system for a mechanism having a sump and including lubricant therein comprising:
   a pump disposed in the sump;
   an accumulator tank;
   a first fluid conduit connecting said pump outlet with said accumulator tank;
   a filter disposed in said first fluid conduit downstream of said pump and upstream of said accumulator tank;
   a first bypass conduit connecting said first fluid conduit with the sump;
   a first normally closed pressure responsive valve disposed in said first bypass conduit, said first pressure responsive valve adapted to open in response to a pressure in said first fluid conduit above a predetermined limit;
   a heat exchanger disposed in said first fluid conduit upstream of said accumulator tank for cooling the lubricant;
   means for regulating the pressure in said accumulator tank;
   spray bars disposed within said mechanism, said spray bars having orifices located therein for spraying lubricant onto the portions of the mechanism requiring lubrication;
   a second fluid conduit connecting said accumulator tank with said spray bars;
   a second bypass conduit having one end connected to said second fluid conduit means and having the other end connected to the sump; and
   a second normally closed pressure responsive valve disposed in said second bypass conduit, said second pressure responsive valve adapted to open in response to a pressure in said first fluid conduit below a predetermined limit.

2. A lubrication system for a mechanism having a sump containing lubricant, which mechanism includes spray bars therein having orifices for spraying oil onto the mechanism, comprising:
   a pump disposed in the sump;
   an accumulator tank;
   a first fluid conduit connecting said accumulator tank and said pump outlet;
   a second fluid conduit connecting said accumulator tank and the spray bars;
   means for regulating the pressure in said accumulator tank;
   a heat exchanger disposed in said first fluid conduit downstream of said pump and upstream of said accumulator tank for cooling the lubricant;
   a first bypass conduit having one end connected to said first fluid conduit downstream of the pump outlet and having the other end connected to the sump;
   a first normally closed pressure responsive valve disposed in said first bypass conduit means adapted to open in response to a pressure in said first fluid conduit above a predetermined limit;
   a second bypass conduit having one end connected to said second fluid conduit and having the other end connected to the sump; and
   a second normally closed pressure responsive valve disposed in said second bypass conduit adapted to open in response to a pressure in said first fluid conduit below a predetermined limit, whereby said second normally closed pressure responsive valve opens in response to a low pressure in said first fluid conduit thereby emptying the lubricant in said accumulator tank into the sump.

(References on following page)

References Cited

UNITED STATES PATENTS

| | | | |
|---|---|---|---|
| 2,072,180 | 3/1937 | Paton | 184—6 |
| 2,852,033 | 9/1958 | Orser. | |
| 2,871,981 | 2/1959 | Baits | 184—6 |
| 2,978,986 | 4/1961 | Carder et al. | 103—223 XR |
| 3,045,419 | 7/1962 | Addie et al. | 184—6 XR |

FOREIGN PATENTS 564,757   10/1944   Great Britain.

FRED C. MATTERN, Jr., Primary Examiner

M. ANTONAKAS, Assistant Examiner

U.S. Cl. X.R.

103—223